United States Patent
Kang et al.

(10) Patent No.: US 8,320,332 B2
(45) Date of Patent: Nov. 27, 2012

(54) IP HANDOFF PROCESS METHOD AND SYSTEM FOR CONNECTION OF INTERNET PROTOCOLS BETWEEN MOBILE AGENTS IN HETEROGENEOUS NETWORK

(75) Inventors: Sung-Soo Kang, Daejeon (KR); Seong-Gon Choi, Chungchungbook-do (KR); Sang-Kwon Kim, Daejeon (KR)

(73) Assignees: Electronics and Telecommunications Research Institute, Daejeon (KR); Chungbuk National University Industry-Academic Cooperation Foundation Chungbuk, Chungju (KR)

( * ) Notice: Subject to any disclaimer, the term of this patent is extended or adjusted under 35 U.S.C. 154(b) by 618 days.

(21) Appl. No.: 12/514,890

(22) PCT Filed: Dec. 8, 2006

(86) PCT No.: PCT/KR2006/005341
§ 371 (c)(1),
(2), (4) Date: May 14, 2009

(87) PCT Pub. No.: WO2008/069356
PCT Pub. Date: Jun. 12, 2008

(65) Prior Publication Data
US 2010/0046469 A1      Feb. 25, 2010

(30) Foreign Application Priority Data

Dec. 8, 2006   (KR) .................. 10-2006-0124369

(51) Int. Cl.
*H04W 4/00* (2009.01)
(52) U.S. Cl. ....................... 370/331; 455/436

(58) Field of Classification Search ............... None
See application file for complete search history.

(56) References Cited

U.S. PATENT DOCUMENTS

| | | | |
|---|---|---|---|
| 6,990,339 B2 | 1/2006 | Turanyi et al. | |
| 7,065,062 B2 | 6/2006 | Madour et al. | |
| 7,633,915 B1 * | 12/2009 | Lewis | 370/338 |

(Continued)

FOREIGN PATENT DOCUMENTS

JP      2006-197107 A2      7/2006

(Continued)

OTHER PUBLICATIONS

International Search Report of International Application No. PCT/KR2006/005341 filed on Dec. 8, 2006.

(Continued)

*Primary Examiner* — Anh-Vu Ly
(74) *Attorney, Agent, or Firm* — Kile Park Goekjian Reed & McManus PLLC

(57) ABSTRACT

An IP handoff process method and Internet service system are provided. In the IP handoff process method, a registration request message for multiple IP handoff is received from a mobile station having a plurality of Internet protocol (IP) addresses through a currently-moving mobile agent of the mobile station. Then, the registration request for multiple IP handoff is processed according to information included in the received registration request message. A reply message thereof is transmitted according to the result of updating the information to the mobile station through the currently-moving mobile agent. Then, the received registration request message is transmitted to a previous mobile agent of the mobile station before moving and a home agent of the mobile station as it is.

26 Claims, 9 Drawing Sheets

U.S. PATENT DOCUMENTS

| | | | |
|---|---|---|---|
| 8,180,349 B1* | 5/2012 | Mohan et al. | 455/437 |
| 2001/0016492 A1* | 8/2001 | Igarashi et al. | 455/433 |
| 2001/0046223 A1 | 11/2001 | Malki et al. | |
| 2002/0085518 A1 | 7/2002 | Lim | |
| 2003/0193952 A1* | 10/2003 | O'Neill | 370/392 |
| 2004/0105413 A1 | 6/2004 | Menon et al. | |
| 2004/0121771 A1* | 6/2004 | Song et al. | 455/436 |
| 2005/0163078 A1 | 7/2005 | Oba et al. | |
| 2006/0019664 A1* | 1/2006 | Nelakanti et al. | 455/436 |
| 2006/0120329 A1* | 6/2006 | Kim et al. | 370/331 |
| 2006/0268782 A1* | 11/2006 | Kwak et al. | 370/331 |
| 2007/0091846 A1* | 4/2007 | Kim et al. | 370/331 |
| 2007/0171886 A1* | 7/2007 | Lewis et al. | 370/338 |
| 2007/0189218 A1* | 8/2007 | Oba et al. | 370/331 |
| 2008/0070573 A1* | 3/2008 | Dutta et al. | 455/435.1 |
| 2010/0020766 A1* | 1/2010 | Kang et al. | 370/331 |
| 2010/0046469 A1* | 2/2010 | Kang et al. | 370/331 |
| 2010/0100639 A1* | 4/2010 | Kang et al. | 709/242 |
| 2010/0111038 A1* | 5/2010 | Kang et al. | 370/331 |
| 2010/0322186 A1* | 12/2010 | Kang et al. | 370/331 |
| 2011/0026488 A1* | 2/2011 | Patel et al. | 370/331 |

FOREIGN PATENT DOCUMENTS

| | | |
|---|---|---|
| KR | 10-2002-0093459 A | 12/2002 |
| KR | 10-2005-0002543 A | 1/2005 |
| KR | 10-2005-0071772 A | 7/2005 |
| KR | 10-2005-0108859 A | 11/2005 |
| KR | 10-2006-0011354 A | 2/2006 |

OTHER PUBLICATIONS

Written Opinion of International Application No. PCT/KR2006/005341 filed on Dec. 8, 2006.

* cited by examiner

Figure 5

| | Z | N | X1 | X2 | X3 | X4 | X5 | X6 | X7 | ••• | |
|---|---|---|----|----|----|----|----|----|----|-----|---|
| R1 | #1 | 2 | A | B | B | B | A | c | c | ••• | 601 |
| R2 | #2 | 1 | A | A | B | C | d | d | | | 602 |
| R3 | #3 | 1 | A | B | A | B | c | c | | | 603 |
| R4 | #4 | 3 | A | B | d | d | d | | | | 604 |

(1) Record of Node in row R1 at X2

> 1) protocol type: B
> 2) status: active
> 3) basic parameter:
>    CoA, home address, lifetime, home agent, etc.
> 4) more parameter
>    inter-protocol handoff capability: yes
>    inter-device IP handoff capability: yes

611

(2) Record of Node in row R4 at X4

> 1) protocol type: d
> 2) status: not active
> 3) basic parameter:
>    CoA, home address, lifetime, home agent, etc.
> 4) more parameter
>    inter-protocol handoff capability: no
>    inter-device IP handoff capability: yes

612

IP HANDOFF PROCESS METHOD AND SYSTEM FOR CONNECTION OF INTERNET PROTOCOLS BETWEEN MOBILE AGENTS IN HETEROGENEOUS NETWORK

TECHNICAL FIELD

The present invention relates to an Internet protocol (IP) handoff process method and an Internet service system and, more particularly, to an IP handoff process method and an Internet service system for allowing multiple IP connections between heterogeneous networks.

BACKGROUND ART

A user terminal using an Internet protocol (IP) may be a mobile node with multiple IP addresses such as two wireless broadband (WiBro) ports. Such a mobile node uses the first IP address to transmit and receive IP packet data and the second IP address as a reserve for the malfunctioning of the first IP address. In this case, the mobile node must use multiple IP addresses having an IP address system under the same medium and the same protocol.

Also, a user terminal may be a mobile node with multiple IP addresses such as cellular type MIPv6 address 1 and WiBro MIPv6 address 2. Such a mobile node uses the first address to transmit and receive IP packet data and the second address for a streaming service. In this case, the mobile node must use multiple IP addresses having the IP address system of the same protocol although the access medium is different.

As another example, a user terminal may be a mobile node with multiple IP address such as a cellular type MIPv6 address 1 and a session initiation protocol (SIP) type MIPv6 address 2. The mobile node uses two different IP addresses to receive a seamless service when the mobile node moves from a cellular type MIPv6 supported area to a SIP type MIPv6 supported area. In this case, the mobile node must have multiple IP addresses having an IP address system of different connection media and protocols.

In trains or airplanes, a mobile network may be provided. Such a mobile network may include various stationary nodes such as a temperature sensor or a pressure sensor and a portable phone having a wireless personal area network (WPAN). The mobile network can provide services by accessing the portable phone and the stationary nodes and connecting the portable phone to external networks. In such a case, the mobile network includes a mobile router to make a connection to an external network. Such a mobile router functions as a gateway connecting a mobile network to an external network. A plurality of nodes may exist in the mobile router, and have the same or different media and signal protocols for handoff. Also, the mobile network may include a plurality of mobile routers to access the external networks, and the mobile routers may use same or different access mediums and signal protocols for handoff.

A large-sized mobile station such as a passenger ship cruising around a long distanced area may include a plurality of mobile networks having sub networks for each floors of the passenger ship. Each of the mobile networks includes multiple mobile routers to make a connection to an external network, and the mobile routers may use the same or different signal protocols for handoff.

If the mobile nodes (MN) or the mobile routers (MR) are allowed to use multiple IP addresses or separate subnets as described above, the mobile nodes or mobile routers depend on the policy of a home agent where the MNs and the MRs are belonged to.

As a conventional technology, a mobility management method was introduced in U.S. Pat. No. 6,990,339 B2 issued to Turanyi et al. and entitled "Mobility Management for Mobile Hosts". The introduced mobility management method can be used for a MIPv4 node and a MIPv6 node. In the mobility management method, a network address identifier (NAI) and a user name service (UNS) were introduced. The NAI is placed between a home agent (HA) and a foreign agent (FA) on a packet path between a correspondent node (CN) and a mobile node (MN) and prevents packet transmission delay and packet loss which may occur if the HA and the FA intervene whenever packet transmission is delayed or handoff occurs. The UNS has a function for mapping IP addresses (CoA) of places where a NM visits. In this method, whenever a MN moves to a FA, the MN transmits an IP address (CoA) obtained from a new FA to a home UNS, and the MN also transmits a message to a CN to inform that the MN moves to a new FA so that the CN obtains the new IP address (CoA) of the MN from the home UNS of the MN to transmit packets. Or, the MN can directly transmit an IP address (CoA) obtained from the new FA to the CN after encoding the obtained IP address (CoA). In this case, the CN receives a key value for decoding the encoded IP address from the home UNS of the MN and obtains the IP address of the MN. Then, the CN transmits packets to the obtained IP address of the MN.

The conventional management method has advantage that a registration procedure is not required and the HA or the FA is not included in a packet path. But, the conventional management method requires the CN and the UNS to have a capability of communicating, and the CN to have the home UNS of a MN if the CN wants to access the MN before the MN accesses the CN. That is, backward compatibility problem is arisen. Also, the MN is required to have a function to recognize and transmit related messages to the UNS or the CN. If the home UNS of the MN is located at long distance, a CN takes long time to obtain an IP address, thereby delaying packet transmission. Therefore, the usability thereof is limited into a mobile node, not into a mobile network.

Another conventional mobility management method was introduced in U.S. Pat. No. 7,065,062 B2 issued at Jun. 20, 2006 and entitled "Mobile Ip mobility management at dormant hand-over in CDMA IP-based cellular packet-data network". This mobility management method can be used for Mobile IPv4 and Mobile IPv6. This conventional mobility management method is a plan to simplify a complex handoff procedure of a dormant mobile node in a CDMA-2000 mobile phone. It is difficult to perform high speed handoff required to registration when a mobile node not in a dormant state changes a FA, that is, when an active mobile node changes a FA.

Furthermore, a conventional mobility architecture, as another related technology, was introduced in U.S. Patent Publication No. 2005/0163078 A1 published at Jul. 28, 2005, and entitled "Mobility architecture using pre-authentication, pre-configuration and/or virtual soft-handoff". In the introduced mobility architecture, a pre-authentication for L2 layer of IEEE 802.11 is extended. That is, in order to perform handoff between local area networks (LAN) having different subnets, a L3 layer is pre-configured and pre-authenticated by sensing a beacon signal of an adjacent access point (AP) is sensed before L2 handoff occurs. Therefore, when an IP handoff occurs according to the movement of a mobile node, resources for necessary IP address are previously allocated in the mobility architecture. The mobile architecture has advantages of safe and rapid L3 handoff in networks such as LAN, Home RF, Wi-Fi, CDMA, TDMA, GSM, and CDMA2000.

When a mobile node moves and detects a L2 layer beacon signal of an adjacent area, the mobile node performs the pre-configuration and the pre-authentication of a L3 layer, that is, an IP address before L2 handoff occurs. When the L2 handoff occurs, the MN instantly changes to the IP address of a current subnet.

The conventional mobility architecture requires a mobile node to have a function for performing a pre-configuration and a pre-authentication for a L2 handoff before the L2 handoff occurs. Therefore, a terminal used in a typical public mobile communication network cannot be used. Also, a MN is required to determine whether a received beacon signal is a beacon signal from an AP in a new subnet or not whenever a mobile node receives beacon signals from a new AP in the same subnet area. That is, the MN is required to process even until the L3 layer to determine whether the mobile node moves to different subnets whenever the mobile node receives a beacon signal of a new AP.

Meanwhile, a handoff process method using a SIP protocol as an IP handoff method was introduced in rfc2543 of IETF. The handoff process method using a SIP protocol is similar to the present invention in a view that a data packet path is separated from a signaling packet path. However, the handoff process method using the SIP protocol requires a SIP redirect server to register whenever IP address changes. Therefore, a handoff time delay becomes lengthened when a mobile node moves far away from a home network. Also, it is difficult to sustain the continuity of TCP session due to the IP address change while a mobile node is moving. In order to sustain the continuity of TCP session, an Internet technologies supporting universal mobile operation (ITSUMO) project was introduced. That is, when a MN changes an IP address while sustaining the TCP session, the handoff is processed using information formed of the original IP address of the MN, the current IP address of the MN, the original IP address of a correspondent host using a current TCP session. However, this method has difficulty to embody a SIPeye agent in a related correspondent host and all MNs. When a mobile IPv6 is used, a hierarchical MIPv6 registration method was introduced. In this method, it requires to be aware of an IP address of an agent of a network where a MN visits. That is, the hierarchical MIPv6 registration method also has the regional registration problem.

A high speed handoff method using a satellite was introduced. The high speed handoff method was developed for voice communication, not for IP packet. Also, the high speed handoff method has a problem of high cost because it requires the satellite. In case of using a satellite such as a geostationary satellite, it has a problem of serious time delay between a node in an earth and a satellite, and a HOL problem because paths for data packet and the handoff signal packet are identical.

In order to overcome problems of conventional handoff technologies, a mobile router is required to have a plurality of IP addresses or support heterogeneous address systems. Also, it requires a method of supporting a mobile network to use a plurality of mobile routers for connecting external network.

DISCLOSURE OF INVENTION

Technical Problem

An aspect of the present invention is to provide an IP handoff processing method and an Internet service system for providing seamless handoff although multiple schemes with different IP signal protocols are used in a mobile network having a mobile node using multiple IP addresses and a plurality of mobile routers.

Another aspect of the present invention is to provide an IP handoff process method and an Internet service system for quickly processing handoff using a typical signal protocol without modifying and for allowing various types of IP handoff signal schemes to be used without modifying the types and contents of signal messages related to handoff.

Technical Solution

According to an aspect of the invention, the invention provides an apparatus including: a method for processing Internet protocol handoff among a plurality of mobile agents allowing a mobile state having a mobile router to use multiple Internet protocols in a mobile agent platform, the method including: receiving a registration request message for multiple IP handoff from a mobile station having a plurality of Internet protocol (IP) addresses through a currently-moving mobile agent of the mobile station; processing the registration request for multiple IP handoff according to information included in the received registration request message; transmitting a reply message for the received registration request message according to the result of updating the information to the mobile station through the currently-moving mobile agent; and transmitting the received registration request message to a previous mobile agent of the mobile station before moving and a home agent of the mobile station as it is.

According to another aspect of the invention, the invention provides an Internet protocol handoff processing system for allowing multiple Internet protocols between heterogeneous networks including: a mobile station having a mobile node and a mobile router; a plurality of mobile agents allowing the mobile station to access multiple IP address at the same time; and a mobile agent platform (MAP) for receiving a handoff registration request message for multiple IP access of the mobile station through a mobile agent where the mobile station visits, instantly transmitting a registration reply message, and transmitting the received registration request message to a home agent of the mobile station and a previous agent without modifying the received registration request message.

Advantageous Effects

An IP handoff process method and an Internet service system according to the certain embodiments of the present invention can provide seamless handoff although multiple IP addresses are used or although multiple schemes with different IP signal protocols are used when an IP address changes because a mobile node or a mobile network moves to a foreign network. Since the IP handoff processing method and the internet service system according to the present invention allows a conventional signal protocol to be used without modification, apparatuses using conventional protocols can be used without modification and the handoff can be quickly provided.

BRIEF DESCRIPTION OF THE DRAWINGS

The above objects, other features and advantages of the present invention will become more apparent by describing the preferred embodiments thereof with reference to the accompanying drawings, in which:

FIG. 5 and FIG. 6 are diagrams illustrating a capability list table in a mobile agent platform according to an embodiment of the present invention;

BEST MODE FOR CARRYING OUT THE INVENTION

Hereinafter, preferred embodiments of the present invention will be described in detail with reference to the attached drawings.

Throughout the specification, MNG denotes a mobile node group which is a plurality of nodes for external access, and a MS denotes a mobile station such as a mobile node and a mobile router included in the MNG for convenience.

At first, a structure of an Internet network for a plurality of IP handoff according to an embodiment of the present invention will be described in brief with reference accompanying drawings.

Figure 1:
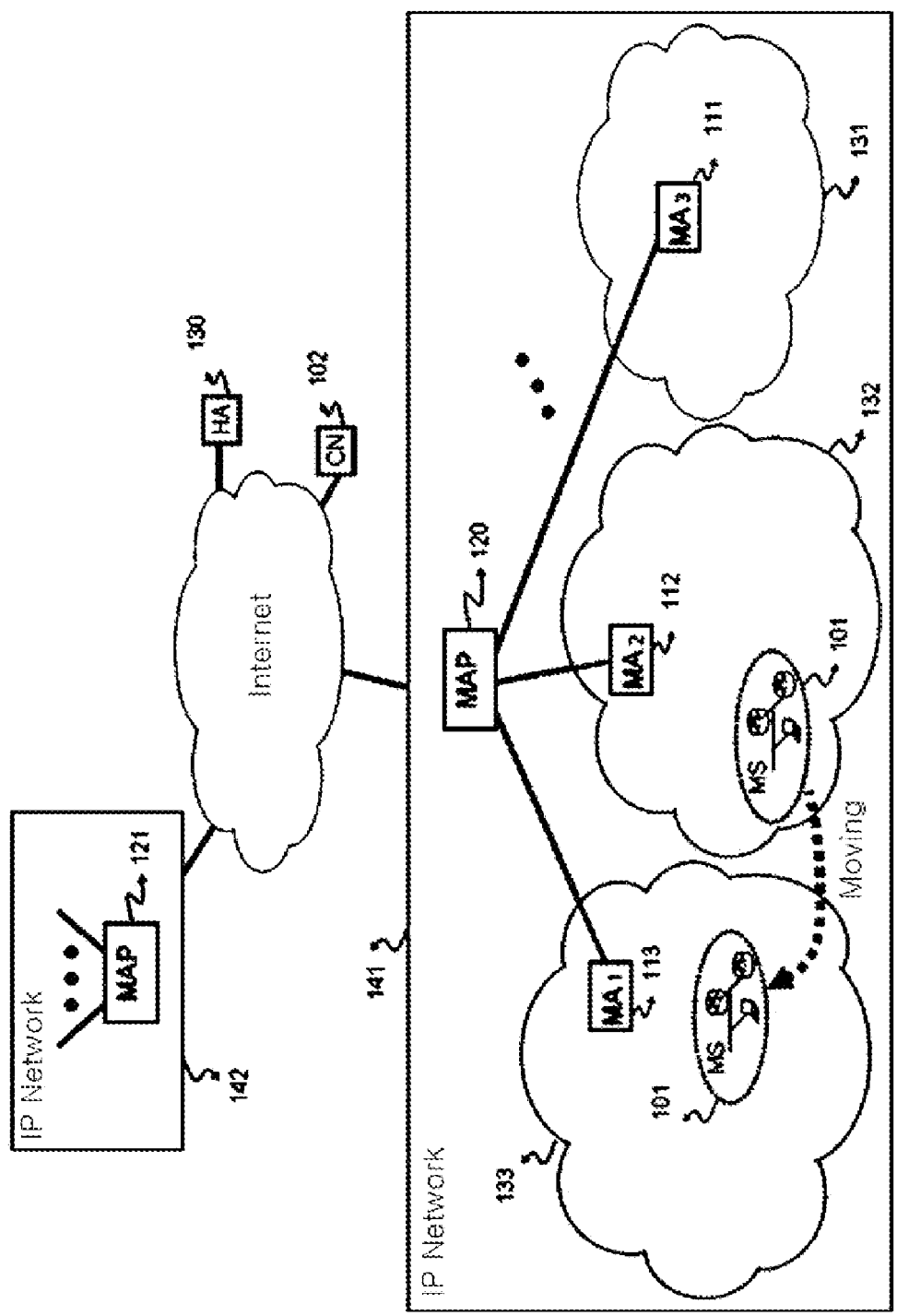
FIG. 1 is a diagram illustrating an Internet structure according to an embodiment of the present invention.

FIG. 1 is a diagram illustrating a structure of an Internet network according to an embodiment of the present invention.

Referring to FIG. 1, the internet service system includes a mobile station (MS) having a mobile node and a mobile router 101, a plurality of mobile agents MA1 113, MA2 112, and MA3 111, a mobile agent platform (MAP) for managing the plurality of mobile agents, and a home agent (HA) 130.

The MA1 113 denotes an mobile agent where the MS 101 are currently visiting after leaving the area of the MA2 112, and the MA1 113 and the MA3 111 are operated as foreign agents (FA) for the MS 101.

The MA2 112 is a mobile agent that is accessed by the MS 101 before the MS 101 moves to the area of the MA3 111.

If the MS 101 registers to the MA1 113 as a subscriber, the MA1 113 becomes the HA of the MS 101.

The HA 130 is a home agent when the MS 101 registers to the other MA located at the outside of the MAP 120's area as a subscriber. In FIG. 1, the MAP 120 is shown to be located at the outside of an area 141 for convenience although a MA in the area 141 of the MAP 120 can become the HA 130.

The IP network 141 becomes an area managed by the MAP 120, and the IP network 142 becomes an area managed by the MAP 121. Although the IP networks 141 and 142 are physically adjacent to each others, they can be mutually or directly connected each others. For convenience, the IP networks 141 and 142 are shown to pass through a foreign network such as the Internet in FIG. 1.

MODE FOR THE INVENTION

Hereinafter, a handoff process method for transmitting and receiving a handoff registration request and a response message thereof between a plurality of mobile agents and a mobile station and between home agents of the mobile station in an Internet service system will be described with reference to accompanying drawings.

In order to process the handoff in the Internet service system described above, a mobile agent platform (MAP) includes a visitor list table, a temp list table, a border list table, and a capability list table. Hereinafter, each table will be described in detail with reference to accompanying drawings.

Figure 2:
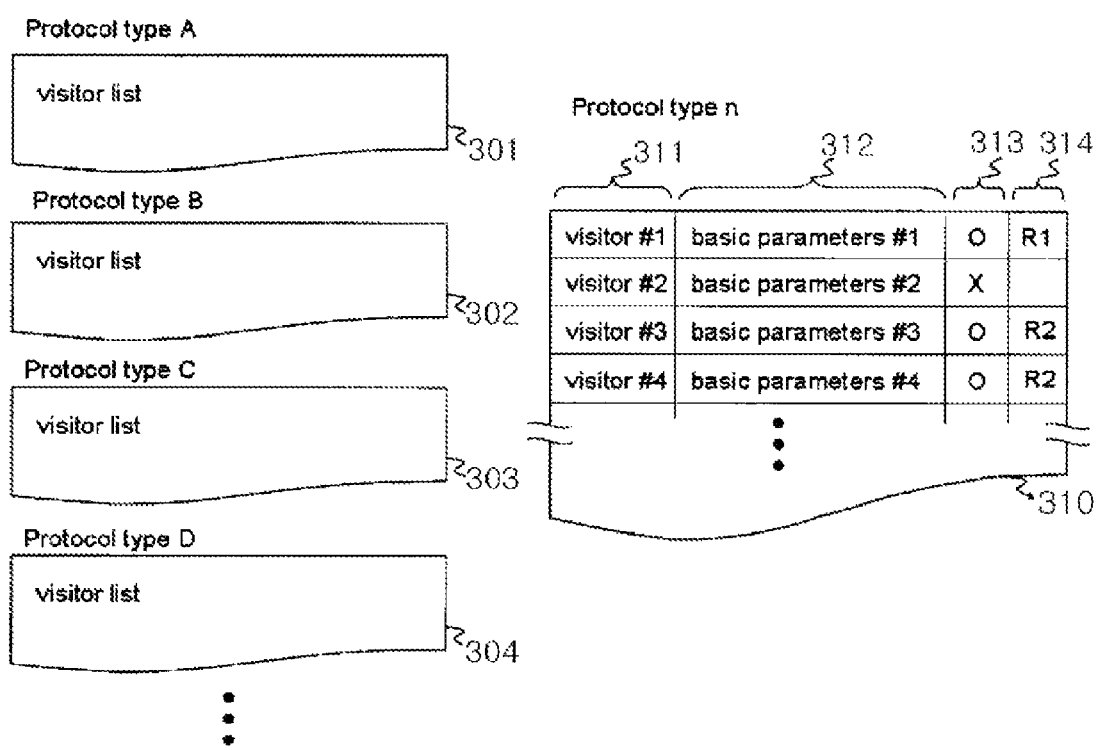
FIG. 2 is a diagram illustrating a visitor list table in a mobile agent platform (MAP) according to an embodiment of the present invention.

FIG. 2 is a diagram illustrating a visitor list table in the inside of the mobile agent platform according to an exemplary embodiment of the present invention.

Referring to FIG. 2, the mobile agent platform includes a plurality of visitor list tables classified according to the protocol types. In FIG. 2, a protocol type A 301, a protocol type B 302, a protocol type C 303, a protocol type D 304, ..., and a protocol type n 310 denote tables which are visitor lists of mobile stations in an area of MAP, classified according to protocol types.

For example, the protocol type A 301 may be considered as a visitor list table following a mobile IPv4 handoff or an IEEE 802.11e handoff procedure. The protocol type B 302 may be considered as a visitor list table following a mobile IPv6 handoff procedure. The protocol type C 303 may be considered as a visitor list table following a network mobility (NEMO) handoff procedure. The protocol type D 304 may be considered as a visitor list table following a session initiation protocol (SIP) procedure or a procedure for adopting a Binding Unique Identification number (BID), which is under discussion in MONAMI6 Work Group of Internet Engineering Task Force (IETF). Also, the protocol type n 310 may be considered as a visitor list table following an IEEE World Interoperability for Microwave Access (WiMAX) procedure.

The protocol type n 310 representatively shows detailed contents of each of visitor list tables in FIG. 2.

As shown, the each of the visitor list tables includes four columns, a first column 311, a second column 312, a third column 313, and a fourth column 314. The first column 311 shows visitors within the area of the mobile agent platform, i.e., the mobile station. The second column 312 shows basic parameters formed of information required for requesting mobile station (MS) registration and allowance thereof. The information includes care-of address (CoA), a home agent, a lifetime, and a foreign agent. Therefore, the format of the first and second columns 311 and 312 is identical to that of the visitor list table of the conventional mobile agent platform.

The third column 313 of the visitor list table 310 is set to indicate that a MS in the first column 311 is one of mobile node groups (MNGs) for determining multiple IP handoff request, or to denote the MS in the first column 311 is a node allowed to perform handoff between mobile stations in MNG or protocols. As shown in FIG. 2, the third columns 313 for the first and third visitors #1 and #3 are set to 'o' which indicates that the first and third visitors #1 and #3 are one of the mobile node groups and are the nodes allowed to perform handoff between the mobile stations or protocols in the mobile node group. The third column 313 of the second visitor #2 is set to 'x' which indicates that the second visitor #2 is not allowed to perform handoff.

The fourth column 314 denotes a location of a capability list if the third column 313 is set to allow handoff to perform. For example, the fourth column 314 of the visitor #3 and the visitor #4 in the table of protocol type n show that the visitor #3 and the visitor #4 are included in the same group of R2 and it means that two IPs are simultaneously used to a mobile terminal or a mobile network using the visitors #3 and #4.

The visitor list tables created by each protocol unit may have the same format of the protocol type n table 310.

Figure 3:
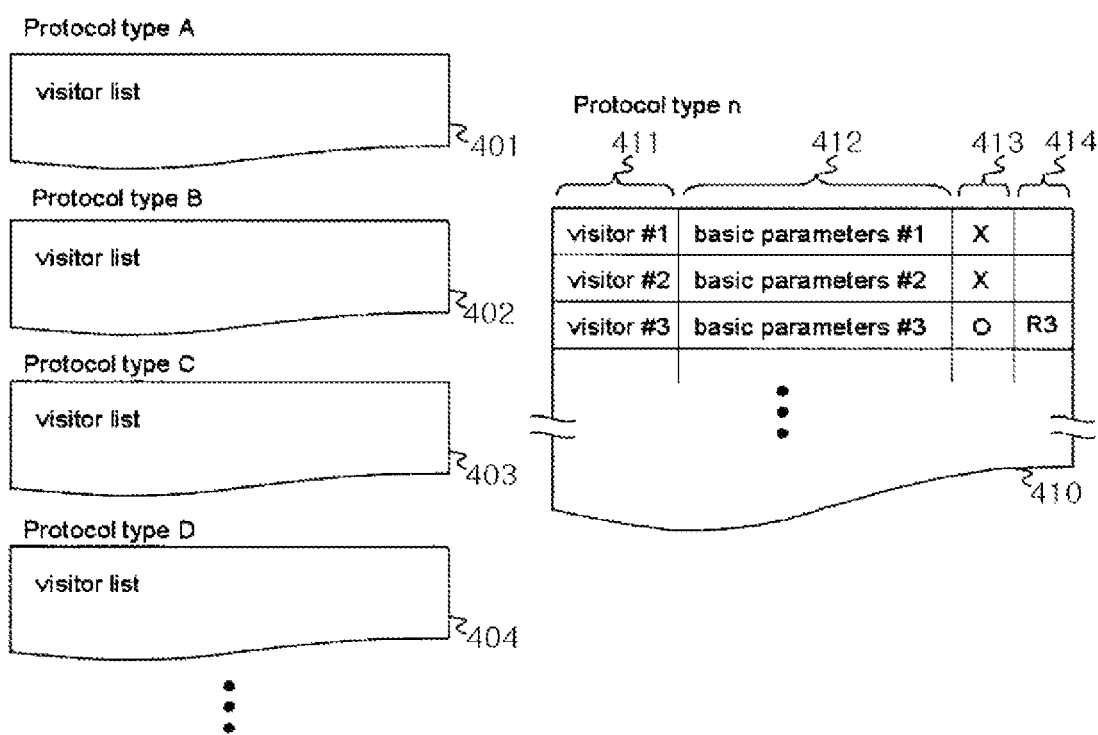
FIG. 3 is a diagram illustrating a temp list table in a mobile agent platform according to an embodiment of the present invention.

FIG. 3 is a diagram illustrating a temp list table in a mobile agent platform according to an exemplary embodiment of the present invention.

Referring to FIG. 3, the MAP includes temp list tables according to protocol types. In FIG. 3, a protocol type A 401, a protocol type B 402, a protocol type C 403, a protocol type D 404, ..., and a protocol type n 410 denote tables which are temp lists of mobile stations in an area of MAP, classified according to protocol types.

For example, the protocol type A 401 may be considered as a temp list table following the mobile IPv4 handoff or the IEEE 802.11e handoff procedure. The protocol type B 402 may be considered as a temp list table following the mobile IPv6 handoff procedure. The protocol type C 403 may be considered as a temp list table following the NEMO handoff procedure. The protocol type D 404 may be considered as a temp list table following the SIP procedure or the procedure for adopting the BID, which is under discussion in MONAMI6 Work Group of IETF. Also, the protocol type n 410 may be considered as a temp list table following the IEEE WiMAX procedure.

The protocol type n 410 representatively shows detailed contents of each of temp list table in FIG. 3.

As shown, each of the temp list table includes four columns, a first column 411, a second column 412, a third column 413, and a fourth column 414. The first column 411 denotes a visitor, for example, a mobile station, in an area of the mobile agent platform. The second column 412 shows basic parameters formed of information required for registration request and registration allowance of the mobile station. The information may include a care of address (CoA), a home agent, a lifetime, and a foreign agent. Therefore, the format of the first and second columns 411 and 412 is identical to that in a temp list table used by a conventional mobile agent platform.

The third column 413 of the temp list table 410 is set to indicate that a MS in the first column 411 is one of mobile node groups (MNGs) for determining multiple IP handoff request, or to denote the MS in the first column 411 is anode allowed to perform handoff between mobile stations in MNG or protocols. Therefore, the third column 413 for the third visitor #3 indicates that the third visitor #3 is one of the mobile node groups and is the node allowed to perform handoff between the mobile stations in the mobile node group or protocols. The third columns 413 of the first visitor #1 and the second visitor #2 show that the first and second visitors #1 and #2 are not allowed to perform handoff.

The fourth column 414 denotes a location of a capability list if the third column 413 is set to allow handoff to perform.

Therefore, the temp list tables created according to each protocol of FIG. 3 have the format identical to that of the protocol type n 410. Excepting the third and fourth columns 413 and 414, the format of the temp list tables is identical to that of a temp list table used by the conventional mobile agent platform.

Figure 4:
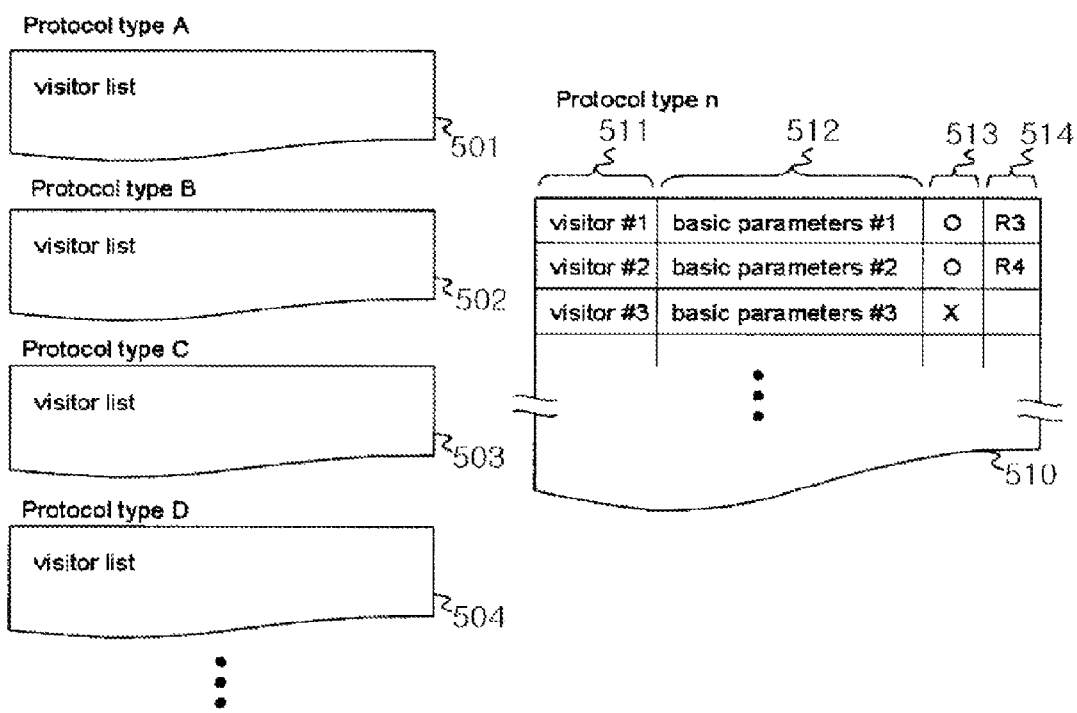
FIG. 4 is a diagram illustrating an border list table in a mobile agent platform according to an embodiment of the present invention.

FIG. 4 is a diagram illustrating a border list table in a mobile agent platform according to an exemplary embodiment of the present invention.

Referring to FIG. 4, the mobile agent platform includes a plurality of border list tables classified according to used protocol types. In FIG. 4, a protocol type A 501, a protocol type B 502, a protocol type C 503, a protocol type D 504, ..., and a protocol type n 510 denote tables which are border lists of mobile stations in an area of MAP, classified according to protocol types.

For example, the protocol type A 501 may be considered as a border list table following the mobile IPv4 handoff or the IEEE 802.11e handoff procedure. The protocol type B 502 may be considered as a border list table following the mobile IPv6 handoff procedure. The protocol type C 503 may be considered as a border list table following the NEMO handoff procedure.

The protocol type D 504 may be considered as a border list table following the SIP procedure or the procedure for adopting the BID, which is under discussion in MONAMI6 Work Group of IETF. Also, the protocol type n 510 may be considered as a border list table following the IEEE WiMAX procedure.

The protocol type n 510 representatively shows detailed contents of each of border list table in FIG. 4.

As shown, each of the border list table includes four columns, a first column 511, a second column 512, a third column 513, and a fourth column 514. The first column denotes a visitor, for example, a mobile station, in an area of the mobile agent platform. The second column 512 shows basic parameters formed of information required for registration request and registration allowance of the mobile station. The information may include a care of address (CoA), a home agent, a lifetime, and a foreign agent. Therefore, the format of the first and second columns 511 and 512 is identical to that in a border list table used by a conventional mobile agent platform.

The third column 513 is set to indicate that a MS in the first column 511 is one of mobile node groups (MNGs) for determining multiple IP handoff request, or to denote the MS in the first column 511 is anode allowed to perform handoff between mobile stations in MNG or protocols. Therefore, the third columns 513 for the first and second visitors #1 and #2 are one of the mobile node groups and are the node allowed to perform handoff between the mobile stations in the mobile node group or protocols. The third column 413 of the third visitor #3 show that the third visitors #3 is not allowed to perform handoff.

The fourth column 514 denotes a location of a capability list if the third column 513 is set to allow handoff to perform.

Therefore, the border list tables created according to each protocol of FIG. 4 have the format identical to that of the protocol type n 510. Excepting the third and fourth columns 513 and 514, the format of the border list tables is identical to that of a border list table used by the conventional mobile agent platform.

FIGS. 5 and 6 are diagrams illustrating the capability list table in a mobile agent platform according to an exemplary embodiment of the present invention.

Referring to FIG. 5, the mobile agent platform includes a capability list table 610 denoting whether or not to allow handoff between different protocols or between mobile stations included in the same mobile node group although the same protocols are used.

The first column in the capability list table 610 is a unique number created by one of mobile stations in a MNG in order to show that the MNG is the same group. For example, the first column is a BID in case of MONAMI6 WG of IETF. The second column thereof shows the number of the active mobile stations, which are used within an area of the current mobile agent platform among the mobile stations included in the mobile node group. The third column shows that characteristics of the mobile stations included in the mobile node group are stored in a record format.

The first row 601 of the capability list table 610 shows mobile stations corresponding to a group R1. The first row 601 also shows that the number of the MSs X1, X2, ..., X7 in the group R1 is 7 and the number of currently using mobile stations which are communicating through an agent platform is 2. The second row 602 shows the mobile stations corresponding to a group R2. The second line 602 shows that the number of the mobile stations X1, X2, . . . , X6 in the group R2 is 6 and the number of currently using mobile stations is 1. Also, the third line 603 shows the mobile stations corresponding to a group R3. The third line 603 shows that the number of the mobile stations X1, X2, . . . , X6 is 6 and the number of currently using mobile stations is 1. Lastly, the fourth line 604 shows the mobile stations corresponding to a group R4. The fourth line 604 shows that the number of mobile stations X1, X2, . . . , X5 in the group R4 is 5 and the number of currently using mobile stations is 3. In FIG. 5, capital letters A,B,C, . . . of X1, . . . , denote the types of protocols. The capital letters denotes that the IP handoff is allowed although the protocols are different each others. Small letters denotes that handoff is only allowed between the same protocols.

The capability table in FIG. 5 shows that IP handoff is allowed between nodes X1 and X2 although protocols are different but IP handoff is allowed between node X3 and X4 or between node X3 and X5 only if they use the same protocol in case of the group R4 604. Also, the handoff to the node X1 is not allowed. For example, it is not allowed to convert data communication by a SIP based mobile phone into data communication based on the WiMAX.

FIG. 6 shows a recode denoting characteristics of each MS such as nodes X1, X2, . . . Xn of the capability list 610. A block 611 is a record denoting characteristics of a MS X2 of the group R1 601 in FIG. 5. As shown in the block 611, a protocol used by a MS X2 is a protocol type B, and the MS X2 is in the active state (status: active). The block 611 also includes basic parameters required for handoff of the MS X2 such as CoA, Home Address, Lifetime and Home agent. The block 611 includes a supplementary parameter (inter-protocol handoff capability: yes) denoting that IP handoff is allowed between different MSs in the group R1, and another supplementary parameter (IP handoff capability: yes) denoting that IP handoff is allowed between different MSs using the same protocol.

A block 612 is a record denoting characteristics of a MS which is a node X4 of the group R4 604 in FIG. 5. As shown in the block 612, a protocol used by a MS X4 is a protocol type d, and the MS X4 is in the not active state (status: not active). The block 612 also includes basic parameters required for handoff of the MS X4 such as CoA, Home Address, Lifetime and Home agent. As like the block 611, the block 612 also includes a supplementary parameter (inter-protocol handoff capability: no) denoting that IP handoff is not allowed between different MSs in the group R1, and another supplementary parameter (IP handoff capability: no) denoting that IP handoff is not allowed between different MSs using the same protocol.

Meanwhile, handoff may occur between different protocols with scheme differently from the configurations shown in the capability list table of FIG. 5. In this case, an appropriate handoff procedure is performed. For example, handoff from a node X1 to a node X3 in a group R1 may be not directly performed. It is restricted to pass through the node X2 to perform handoff from the node X1 to the node X3. Such a handoff scheme may be decided according to the characteristics, functions of each MS, and management policy. Since such a handoff scheme is an application level matter, it is not discussed in this specification.

Hereinafter, a method of processing multiple IP handoff using not only the visitor list, the temp list, and the border list, but also the capability list that is newly added according to an embodiment of the present invent will be described with reference to accompanying drawings.

Figure 7:
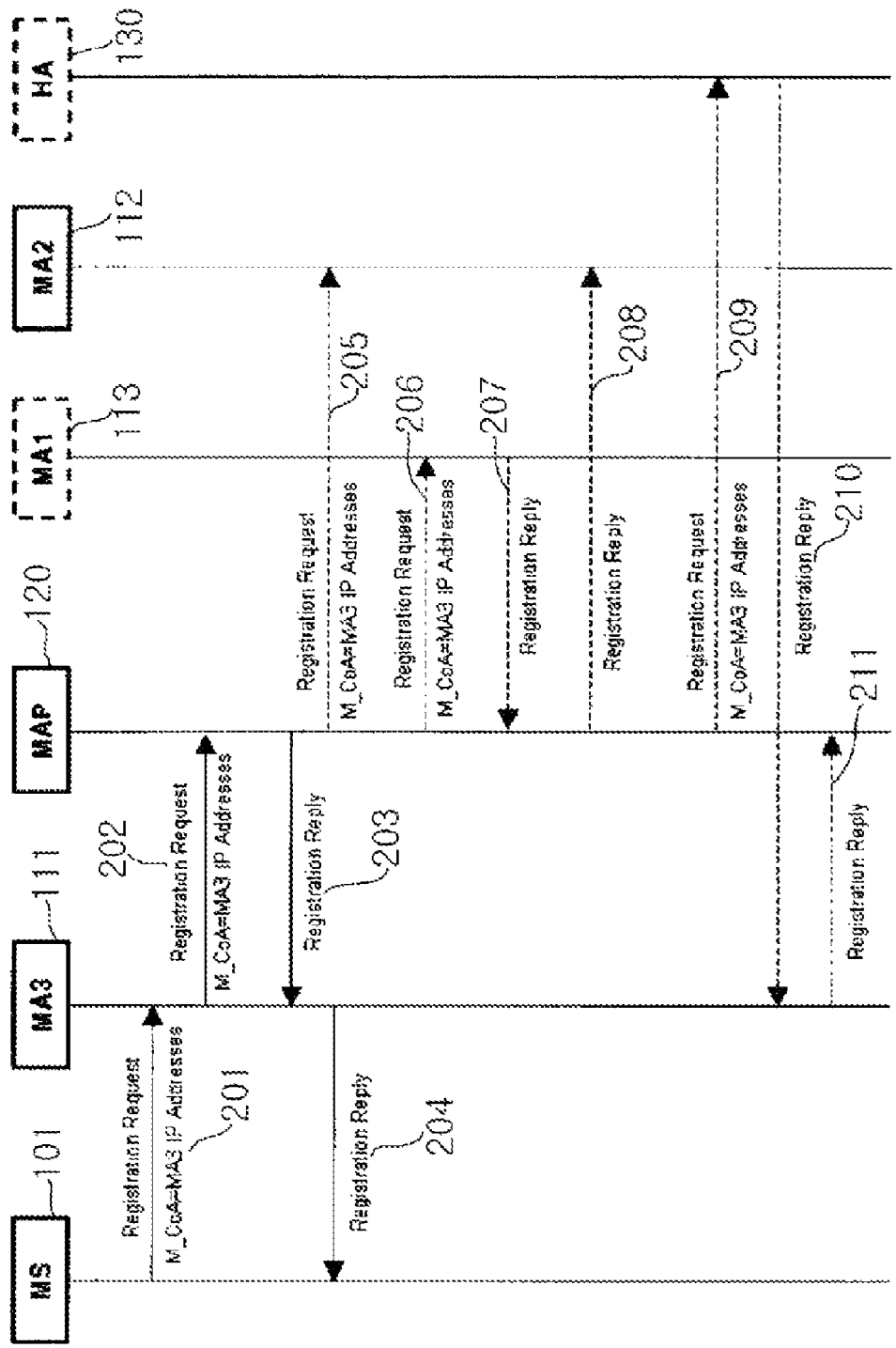
FIG. 7 is a flowchart illustrating a method for processing handoff between a mobile agent allowing a plurality of IP accesses and the home agent of a mobile node according to an embodiment of the present invention.

FIG. 7 is a flowchart illustrating a method of processing handoff between a mobile agent allowing multiple IP connections and a home agent of a mobile node according to an embodiment of the present invention.

Referring to FIG. 7, at step S201, a MS 101 transmits a handoff registration request message (Registration Request M_CoA=MA3 IP Addresses) for multiple IP connections to a third mobile agent MA3 111. Herein, the registration request message may be created and transmitted based on binding unique identification number (BID), which is discussed in MONAMI6 Work Group of IETF (reference: draft-wakikawa-mobileip-multiplecoa-05.txt), or based on a handoff signal protocol employed between MS and HA of MS.

At step S202, the MA3 111 transfers the received registration request message from the MS 101 to a MAP 120.

If the HA of the MS 101 is located in the area of the MAP 120, the MAP 120 instantly transmits a registration response message (Registration reply) to the MS 101 through the MA3 111 in response to the registration request message for multiple IP connections received from the MAP 120 through the MA3 111 at steps S203 and S204.

At step S205, the MAP 120 transfers the registration request message received through the MA3 111 to a MA1 113 that is a HA of the MS 101 without modifying the contents thereof, and at step S206, the MAP 120 transfers the registration request message to the MA2 112 as it is.

At step S207, the MAP 120 receives the registration replay message from the MA1 113, and modifies lifetime information of the MS 101, which is stored in the MAP 120 according to the lifetime stored in the response message. Then, at step S208, the MAP 120 transfers the received registration replay message to the MA2 112 instead of transferring to the MS 101.

If the home agent of the MS 101 is out of the area of the MAP 120, the MAP 120 transfers the registration request message for multiple IP connections to the HA 130 of the MS 101 at step S209, and the MAP 120 transfers the replay message thereof to the MA3 111 which is a MA visited by the MS 101 at step S210. In this case, the MA3 111 recognizes that the registration reply message is transmitted from other MA that is not MAP 120 and transfers the reply message to the MAP 120 at step S211.

Hereinafter, a procedure of receiving a registration request message for handoff from a MA in a MAP and processing the received registration request message in a handoff process will be described with reference to accompanying drawings.

Figure 8:
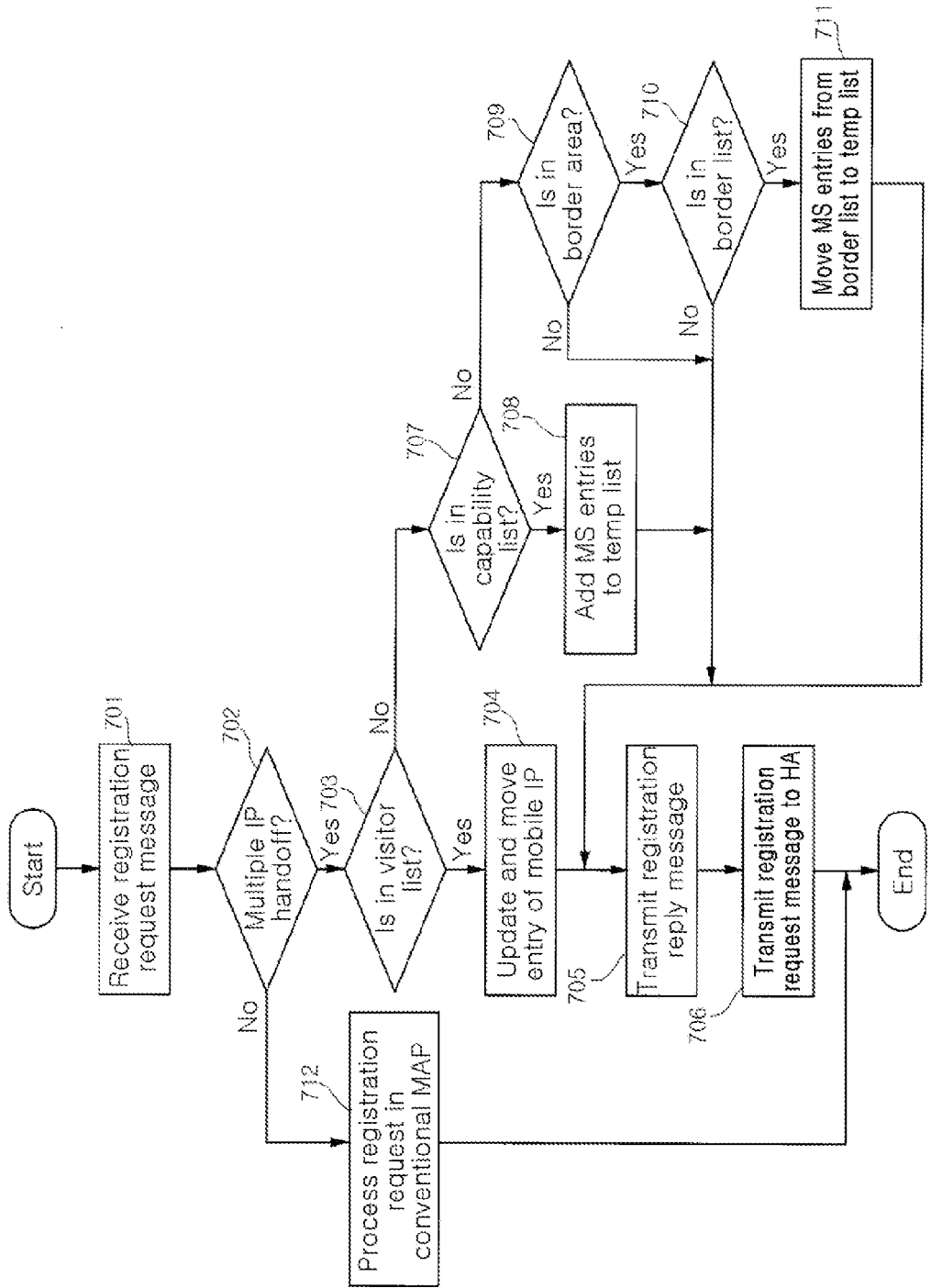
FIG. 8 is a flowchart illustrating a method of processing an IP handoff registration request in a mobile agent platform (MAP) according to an embodiment of the present invention.

FIG. 8 is a flowchart illustrating a method of processing an IP handoff registration request in a mobile agent platform (MAP) according to an embodiment of the present invention.

Referring to FIG. 8, at step S701, the MAP 120 receives a registration request message from a mobile agent MA3 111. Herein, since the MAP 120 already knew what type of protocol is used in the MA3 111, the MAP 120 can receive messages from the MA3 111. Therefore, the MAP 120 searches or updates a protocol list according to a protocol used by the MA3 111 from the visitor list table, the temp list table, and the border list table as shown in FIG. 2, FIG. 4, FIG. 5, and FIG. 7.

At step S702, the MAP 120 determines whether the received registration request message from the MA is for multiple IP handoff registration or not. If the received registration request message is not for multiple IP handoff registration, the MAP 120 performs a conventional registration request processing procedure at step S712. On the contrary, if the received registration request message is for multiple IP handoff registration, the MAP 120 determines whether an entry for a corresponding MS 101 is present in the visitor list table or not at step S703. If the entry is in the visitor list, the step S707 is performed. If not, the step S704 is performed.

At the step S704, the MAP 120 updates entries of MS in a visitor list by the received registration request message of MS, and the MAP 120 updates parameters such as a CoA or whether to use each node or not according to a protocol type and the amount which are requested by a MS based on the capability list stored therein. The MAP 120 moves the entries of MS included in multiple IP handoff registration replay messages requested by MS from a visitor list to a temp list. Herein, the entries of MS are deleted from the visitor list.

Afterward, at step S705, the MAP 120 transmits the registration reply message form the multiple IP handoff registration to the MS 101 through a MA3 111 where the MS 101 belongs instead of the HA 120 of the MS 101. Then, the MAP 120 transmits the received registration request message to the home agent 130 without modification at step S706.

On the contrary, if the MS 101 is not in the visitor list, the MAP 120 determines the MS 101 is in a capability list thereof or not at step S707. If the MS 101 is in the capability list, step S709 is performed. If not, step S708 is performed.

At step S708, the MAP 120 modifies the entries of MS in the visitor list thereof by the received registration request message of MS, and modifies parameters such as CoA and whether to use each node or not according to a protocol type and the amount requested by a MS based on the capability list stored therein. Then, the entries of MS included in the registration request message for multiple IP handoff requested from the MS 101 are added into a temp list, and the step S705 is performed.

On the contrary, if the entry of the MS 101 is not in the capability list thereof, the MAP 120 determines whether the MS 101 is in a border area or not at step S709. If the entry of the MS 101 is not in the border area, the step S705 is performed. If not, it determines whether the entry is in a border list or not at step S710. If the entry is not in the border list, the MAP 120 performs the step S705, thereby performing post processes.

If the entry of the MS 101 is in the border list, the MAP 120 updates the entries of MS in the visitor list, and updates the capability list stored in therein. Also, the MAP 120 moves the entries of MSs included in the registration replay message for multiple IP handoff from the border list to the temp list. Herein, the entries of MSs are deleted from the border list.

Hereinafter, a procedure of receiving a registration reply message for handoff from a MA and processing the received registration replay message at a MAP will be described with reference accompanying drawings.

Figure 9:
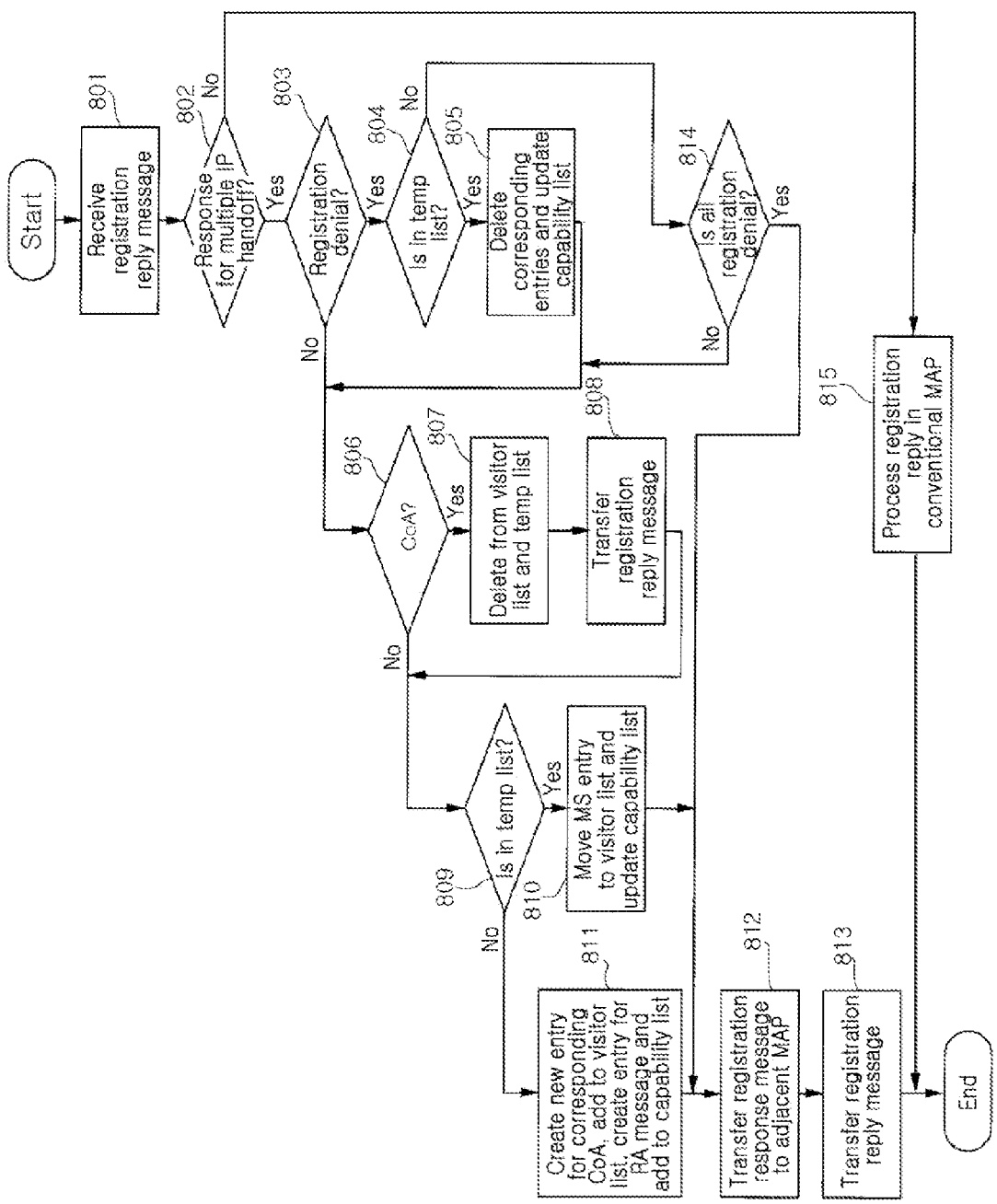
FIG. 9 is a flowchart illustrating a method of processing an IP handoff registration response in an MAP according to an embodiment of the present invention.

FIG. 9 is a flowchart illustrating a method of processing an IP handoff registration response in an MAP according to an embodiment of the present invention.

Referring to FIG. 9, at step S801, the MAP 120 receives a registration replay message for handoff from a MA1 113 that is a HA of a MS.

At step S802, the MAP 120 determines whether the received message is a response for a multiple IP handoff registration request or not.

That is, at step S802, it determines whether a message received from a MA is a registration reply message for multiple IF handoff of a MS or not. If the received message is not the registration reply message, a conventional registration process procedure is performed at the MAP at step S815.

On the contrary, if the received message is the registration reply message, the MAP 120 determines whether or not the registration reply message includes any one of care of addresses (CoA) that is denied to register according to an IP handoff registration request. If the registration relay message does not include such a CoA, a step S806 is performed. If the registration replay message includes such a CoA, the MAP 120 determines whether the registration denied CoA is in a temp list in a MAP or not. Herein, the registration reply message includes whether to allow multiple IP addresses of home address and IP handoff or not, a CoA, a lifetime, and a protocol type. After registration, it can be determined by the home address at step S804.

If the registration denied CoA is included in the temp list at step S804, the MAP 120 deletes the entries corresponding to the registration denied CoAs in the received registration replay message from the temp list of the MAP 120. Then, the MAP 120 modifies the contents of entries corresponding to CoAs of mobile stations in a capability list of the MAP 120, at step S805, and the step S806 is performed. On the contrary if the registration denied CoA is not included in the temp list at step S804, the MAP 120 determines whether entire contents of the received registration response message are registration denial or not at step S814. If the entire contents are registration denial, the step S812 is performed. If not, the step S806 is performed, thereby performing post processes.

On the contrary, if the registration denied CoA is not in the temp list at step S804, the MAP 120 determines whether de-registered CoAs are included in the received registration reply message or not at step S806. If such de-registered CoAs are not included, the step S809 is performed. If such de-registered CoAs are included in the received registration reply message, the MAP 120 deletes entries corresponding the de-registered CoA from a visitor list and a temp list in the MAP 160 at step S807. Then, the MAP 120 transfers the registration reply message to a FA having a corresponding CoA and modifies a capability list in the MAP 120 at step S808.

At step S809, the MAP 120 determines whether entries corresponding to remained CoAs in the received registration reply message except the registration denied CoAs and de-registered CoAs are in a temp list or not. If such entries in the temp list, the MAP 120 moves the entries of the remained CoAs from the temp list to a visitor list according to a protocol type at step S810, and the MAP 120 deletes the moved entries from the temp list. Herein, the MAP 120 modifies and updates parameters such as lifetime according to the contents of registration reply message, and also modifies a capability list in the MAP 120. Then, the step S812 is performed.

If the entries corresponding to the remained CoAs are not in the temp list at step S809, the MAP 120 creates new entries corresponding to registration allowance CoAs among entries corresponding to the remained CoAs, adds the created new entries to a visitor list according to a protocol type, creates entries corresponding to the registration response message according to the contents of the registration replay message, and adds the created entries to the capability list at step S811.

At step S812, the registration reply message is transferred to the adjacent MAP when the MS 101 is in the border area, and the received registration reply message is transferred to mobile agent where a MS currently visits as it is at step S813. Then, the described procedure is terminated.

As described above, the handoff process method according to the certain embodiment of the present invention can provide seamless handoff although a mobile node or a mobile network uses multiple IP addresses or different schemes with different IP signal protocols when a mobile node including at least one of external interfaces or a mobile network having at least one of mobile router changes the IP address thereof by moving to a foreign network. Since the conventional protocol type is used without modification in the certain embodiment of the present invention, devices using the conventional protocol are allowed to be used without modification. Also, it is possible to perform quick handoff. Particularly, various IP handoff signal schemes can be used because signal messages related to handoff are not modified in the certain embodiment of the present invention.

Also, the interface of a mobile router MR for accessing a foreign network is not distinguished from an interface of a mobile node in the certain embodiment of the present invention. In case of a mobile network having a plurality of MRs or a MN having a plurality of interfaces, they are processed through grouping. Therefore, the mobile network with multiple MRs or the MN with multiple interfaces can be processed identically to a mobile terminal with multiple interfaces.

Although the preferred embodiments of the present invention have been disclosed for illustrative purpose, those skilled in the art will appreciate that various modifications, additions and substitutions can be made without departing from the scope and spirit of the invention as defined in the accompanying claims.

INDUSTRIAL APPLICABILITY

An IP handoff process method and an Internet service system for allowing multiple IP connections between heterogeneous networks are provided. The IP handoff process method and the Internet service system can provide seamless handoff although a mobile node or a mobile network uses multiple IP addresses or different schemes with different IP signal protocols when a mobile node including at least one of external interfaces or a mobile network having at least one of mobile router changes the IP address thereof by moving to a foreign network. Since the conventional protocol type is used without modification in the certain embodiment of the present invention, devices using the conventional protocol are allowed to be used without modification.

The invention claimed is:

1. A method for processing Internet protocol handoff among a plurality of mobile agents allowing a mobile station having a mobile router to use multiple Internet protocols in a mobile agent platform (MAP), the method comprising:
   receiving a registration request message for multiple IP handoff from a mobile station having a plurality of Internet protocol (IP) addresses through a currently-moving mobile agent of the mobile station;
   processing the registration request for multiple IP handoff according to information included in the received registration request message, wherein the processing comprises:
      determining whether the mobile station is present in a visitor list, a capability list, or a border list; and
      when the mobile station is present in the visitor list, the capability list, or the border list, moving the entries of the mobile station from the corresponding list to a temp list;
   transmitting a reply message for the received registration request message according to the result of updating the information to the mobile station through the currently-moving mobile agent; and
   transmitting the received registration request message to a previous mobile agent of the mobile station before moving and a home agent of the mobile station as it is.

2. The method according to claim 1, further comprising: processing a registration reply for multiple IP handoff according to information included in a registration reply message when the registration reply message is received from the home agent of the mobile station; and
   transmitting the received reply message to the currently-moving mobile agent according to the registration reply process as it is.

3. The method according to claim 2, further comprising updating lifetime information of the mobile station, which are previously stored according to a preset lifetime included in the message through information included in the received reply message.

4. The method according to claim 1, wherein the processing comprises:
   updating entries of the mobile station if the mobile station is present in the visitor list, and moving the updated entries from the visitor list to the temp list.

5. The method according to claim 1, wherein the processing comprises:
   determining whether the mobile station is present in the capability list if the mobile station is not present in the visitor list;
   moving the entries of the mobile station from the capability list to the temp list if the mobile station is present in the capability list.

6. The method according to claim 1, wherein the processing comprises:
   determining whether the mobile station is present in the border list if the mobile station is not present in the visitor list and is not present in the capability list;
   moving the entries of the mobile station from the border list to the temp list if the mobile station is present in the border list.

7. The method according to claim 3, wherein the processing the registration reply comprises:
   determining whether a registration denied care of address (CoA) is included in CoAs included in the received registration reply message, which are requested to register by the mobile station;
   deleting an entry of the registration denied CoA from the temp list if the registration denied CoA is in the temp list; and
   updating the capability list with the CoAs requested to register by the mobile station.

8. The method according to claim 7, wherein the processing the registration reply further comprises:
   determining whether de-registered CoA is included in the CoAs requested to register by the mobile station if the register denied CoA is not included in the CoAs requested to register by the mobile station;
   deleting a corresponding entry from the visitor list and the temp list if the de-registered CoA is included; and
   transferring the registration reply message to a foreign mobile agent having the de-registered CoA.

9. The method according to claim 8, wherein the processing the registration reply further comprises:
   determining whether entries of remained CoAs requested to register by the mobile station are present in the temp list or not if the de-registered CoA is not present;
   moving entries for the remained CoAs from the temp list to the visitor list if the entries of the remained CoAs are present in the temp list; and
   deleting the entries of the remained CoAs from the temp list.

10. The method according to claim 9, wherein the processing the registration reply further comprises:
    creating new entries for the remained CoAs if the entries for the remained CoAs are not present in the temp list;
    adding the created entries to the visitor list; and creating entries for the registration reply message and adding the created entries to the capability list.

11. The method according to claim 1, wherein the capability list denotes whether mobile stations in a mobile node group are allowed to perform handoff between different protocols or between mobile stations in a same mobile node group although the same protocol is used, and the capability list include an unique number denoting the same mobile node group, the number of mobile stations in an area of the MAP, and characteristics of mobile stations in the same mobile node group in a record format.

12. The method according to claim 11, wherein the records of the characteristics of the mobile station included in the capability list include a protocol type used by a mobile station, information about whether or not to currently use, basic parameters for handoff, information about whether or not to allow handoff between different protocols, and information about whether to allow handoff between mobile stations.

13. The method according to claim 1, wherein the temp list include tables classified by a protocol type used by mobile stations in an area of the MAP.

14. The method according to claim 1, wherein the visitor list includes tables classified by a protocol type used by mobile stations in an area of the MAP, and each of the tables includes information about mobile stations receiving a service in a related area, basic parameters, information about whether or not to request multiple IP handoff, and information about a mobile node group location.

15. The method according to claim 1, wherein the border list includes tables classified by a protocol type used by mobile stations located at a border area of the MAP, and each of the tables includes information about mobile stations receiving a service, basic parameters, information about whether or not to request multiple IP handoff, and mobile node group location information.

16. An IP (Internet protocol) handoff processing system for allowing multiple Internet protocols between heterogeneous networks comprising:
a mobile station having a mobile node and a mobile router;
a plurality of mobile agents allowing the mobile station to access multiple IP addresses at the same time; and
a mobile agent platform (MAP) for:
receiving a handoff registration request message for multiple IP access of the mobile station through a mobile agent where the mobile station visits,
processing the registration request message by:
determining whether the mobile station is present in a visitor list, a capability list, or a border list; and
when the mobile station is present in the visitor list, the capability list, or the border list, moving the entries of the mobile station from the corresponding list to a temp list;
transmitting a registration reply message, and
transmitting the received registration request message to a home agent of the mobile station and a previous agent without modifying the received registration request message.

17. The IP handoff processing system according to claim 16, wherein the mobile agent allows the mobile station to access multiple IP at the same time, and the multiple IP is multiple IP in the same subnet, multiple IP using different subnets, and multiple IP using different signal protocols.

18. The IP handoff processing system according to claim 16, wherein the mobile agent platform processes the registration reply message using the lists.

19. The IP handoff processing system according to claim 16, wherein the mobile agent platform searches registration denied care of addresses (CoA) for the multiple IP handoff registration request from the received registration response message, and deletes entries of the searched registration denied CoAs from the temp list, and the mobile agent platform searches de-registered CoAs if the registration denied CoAs are not present, and deletes the searched de-registered CoAs from the visitor list and the temp list.

20. The IP handoff processing system according to claim 16, wherein if remained CoAs in the received registration reply message except the registration denied CoAs and the de-registered CoAs are present in the temp list, the mobile agent platform deletes entries of the remained CoAs from the temp list, and moves the entries to the visitor list.

21. The IP handoff processing system according to claim 20, wherein if remained CoAs in the received registration reply message except the registration denied CoAs and the de-registered CoAs are not present in the temp list, the mobile agent platform creates new CoAs for the mobile station, adds the created CoAs to the visitor list, creates an entry for the registration reply message, and adds the created entry to the capability list.

22. The IP handoff processing system according to claim 16, wherein the capability list denotes whether mobile stations in a mobile node group are allowed to perform handoff between different protocols or between mobile stations in a same mobile node group although the same protocol is used, and the capability list include an unique number denoting the same mobile node group, the number of mobile stations in an area of a MAP, and characteristics of mobile stations in the same mobile node group in a record format.

23. The IP handoff processing system according to claim 22, wherein the records for the characteristics of the mobile station included in the capability list include a protocol type used by a mobile station, information about whether or not to currently use, basic parameters for handoff, information about whether or not to allow handoff between different protocols, and information about whether to allow handoff between mobile stations.

24. The method according to claim 10, wherein the capability list denotes whether mobile stations in a mobile node group are allowed to perform handoff between different protocols or between mobile stations in a same mobile node group although the same protocol is used, and the capability list include an unique number denoting the same mobile node group, the number of mobile stations in an area of the MAP, and characteristics of mobile stations in the same mobile node group in a record format.

25. The method according to claim 10, wherein the temp list include tables classified by a protocol type used by mobile stations in an area of the MAP.

26. The method according to claim 10, wherein the visitor list includes tables classified by a protocol type used by mobile stations in an area of the MAP, and each of the tables includes information about mobile stations receiving a service in a related area, basic parameters, information about whether or not to request multiple IP handoff, and information about a mobile node group location.

* * * * *